US012770103B1

(12) United States Patent
Qin

(10) Patent No.: US 12,770,103 B1
(45) Date of Patent: Oct. 20, 2026

(54) METHOD AND SYSTEM FOR HOUSEHOLD STORAGE MANAGEMENT

(71) Applicant: Xueling Qin, Guangdong (CN)

(72) Inventor: Xueling Qin, Guangdong (CN)

( * ) Notice: Subject to any disclaimer, the term of this patent is extended or adjusted under 35 U.S.C. 154(b) by 0 days.

(21) Appl. No.: 19/421,942

(22) Filed: Dec. 16, 2025

(51) Int. Cl.
*G06Q 10/087* (2023.01)
*G06K 7/14* (2006.01)
*G06T 11/00* (2026.01)

(52) U.S. Cl.
CPC . *G06Q 10/08774* (2025.08); *G06Q 10/08776* (2025.08); *G06T 11/00* (2013.01); *G06K 7/1413* (2013.01); *G06K 7/1417* (2013.01); *G06T 2200/24* (2013.01)

(58) Field of Classification Search
CPC ........ G06Q 10/08774; G06Q 10/08776; G06T 11/00; G06T 2200/24; G06K 7/1413; G06K 7/1417
See application file for complete search history.

(56) References Cited

U.S. PATENT DOCUMENTS 8,717,182 B1 * 5/2014 Brashears .......... G06K 7/10722 340/572.1
10,586,208 B2 * 3/2020 Buibas ................. G06Q 10/087
2013/0138656 A1 * 5/2013 Wheaton ................ G06Q 30/06 709/219

* cited by examiner

*Primary Examiner* — A. Hunter Wilder
*Assistant Examiner* — Joseph M Mutschler
(74) *Attorney, Agent, or Firm* — Hawaii Patent Services; Nathaniel K. Fedde; Kenton N. Fedde

(57) ABSTRACT

The present disclosure relates to a method and a system for household storage management, comprising a distributed hardware system consisting of a host and multiple sub-machines. The host creates digital and image records for items through image capture and processing with mobile terminals, while sub-machines collect temperature and humidity data of storage environments and transmit them to the host through wired or wireless connections. The system enables item registration, intelligent expiry date calculation, multi-terminal synchronization, and proactive reminders through a mobile terminal app. The modular independent design of the system adapts to various storage scenarios, forming a closed-loop "record-monitor-remind" management system, effectively addressing the shortcomings of traditional storage methods, such as missing information, inefficiency, and the limited scalability of existing smart solutions, significantly improving storage management efficiency and reducing resource waste.

16 Claims, 10 Drawing Sheets

METHOD AND SYSTEM FOR HOUSEHOLD STORAGE MANAGEMENT

TECHNICAL FIELD

The present disclosure relates to the technical field of household storage, specifically to a method and a system for household storage management.

BACKGROUND

In current household storage scenarios, most users face the core pain points of "vague item inventory and lack of expiry date control," leading to inefficient storage management and severe resource waste. On one hand, household items cover diverse categories such as food, medicine, cosmetics, daily necessities, clothing, and accessories. Traditional storage methods rely solely on physical storage tools (e.g., storage boxes, shelves) for spatial organization, lacking systematic recording of item information. After storage, users often forget the location, quantity, category, or shelf life of items, resulting in duplicate purchases, idle accumulation, and difficulty in quickly identifying item status, creating a vicious cycle of "storage equals forgetting."

On the other hand, for items with clear shelf life or usage periods, such as food, medicine, and cosmetics, traditional management relies on manual memory or handwritten records, posing risks: manual expiry date calculation is prone to date confusion or miscalculation; the lack of proactive reminder mechanisms leads to untimely handling of near-expiry items, causing waste or safety hazards; expired items are hard to trace quickly, requiring inefficient searches across all storage spaces for cleanup.

Existing storage solutions on the market have clear limitations: physical storage tools (e.g., modular shelves, transparent drawers) only optimize space utilization without enabling digital and image records management of item information. A few smart storage products (e.g., branded smart wardrobes) use integrated furniture designs with poor adaptability, limited to specific new furniture models, failing to meet functional upgrade needs for existing furniture or cover full-scenario storage demands (e.g., wardrobes, cabinets, storage rooms), restricting the popularization of smart storage features and their adaptability to diverse household scenarios.

SUMMARY

The present disclosure provides a method and a system for household storage management to address the problems and difficulties outlined in the background art.

To achieve the above objective, the present disclosure adopts the following technical solution:

A method for household storage management includes the following steps of: collecting item information, the item information including at least one of quantity or expiry date of items; creating digital and image records for each item based on the collected item information, the digital and image records including at least data related to the quantity and/or expiry date of the items; setting a reminder condition according to the data related to the quantity and/or expiry date in the digital and image records, monitoring the data, and determining whether the reminder condition is met; and when the monitored data related to the quantity and/or expiry date meets the preset reminder condition, automatically generating and outputting management reminder information, and pushing the management reminder information to a client by at least one of the following methods: display module, sound reminder, or wireless communication, prompting a user to manage the items.

A system for household storage management includes a host, the host including: a sensing module configured to collect item information of items to be stored, the item information including at least one of quantity and expiry date of the items; a control module communicatively coupled to the sensing module; a display module communicatively coupled to the control module and configured to present information; and a warning module communicatively coupled to the control module and configured to issue perceptible warning information.

The control module is configured to: create or update digital and image records for the items based on the item information collected by the sensing module, the digital and image records including at least data related to quantity and/or expiry date of the items; set a reminder condition based on the data related to quantity and/or expiry date in the digital and image records, monitor the data, and determine whether the reminder condition is met; and when it is detected that the data related to quantity and/or expiry date meets the preset reminder condition, automatically generate and output management reminder information, push the management reminder information to a client through at least one of the display module, sound reminder, or wireless communication to prompt a user to manage the items.

The beneficial effects of the present disclosure compared to the prior art are as follows:

The basic solution establishes a standardized storage management process, leveraging the host 100 operating system to achieve standardized recording of item information and intelligent reminders, preventing items such as food, medicine, and cosmetics from being forgotten and expiring, significantly improving item utilization and safety; the extended solution further eliminates the tedious steps of manual periodic checks by introducing item labeling technology, enabling automatic updates of inventory and improving management efficiency. Traditional storage relies on manual recording and searching for items, which is time-consuming and error-prone. This disclosure simplifies data entry through technologies such as barcode recognition and AI image recognition, and quickly locates items through the search function of the mobile terminal app, greatly improving entry and search efficiency. Multi-device collaboration and family sharing features allow multiple family members to manage the same stored items simultaneously, avoiding duplicate purchases and overlooked items, thereby enhancing overall storage efficiency. The distributed deployment of sub-machine 200 enables precise environmental monitoring for different storage scenarios, providing suitable environmental protection for item storage and reducing the risk of item damage due to unsuitable conditions. The host 100 and sub-machine 200 adopt a modular design, allowing the number of sub-machines 200 to be adjusted as needed, with flexible wireless communication covering larger indoor environments. Whether it is a refrigerator, wardrobe, bookcase, or storage cabinet, the system can be easily deployed, offering better versatility and scalability compared to traditional smart cabinets that can only retrofit specific compartments. Compared to existing smart storage technologies requiring complex mechanical structures, this disclosure primarily relies on electronic sensing and software algorithms to achieve intelligent functions, with relatively simple hardware structures. Wireless solutions and software upgrades reduce reliance on complex mechanisms, thereby lowering overall costs and maintenance difficulty.

BRIEF DESCRIPTION OF DRAWINGS

The drawings, which form a part of this application, are provided to further illustrate the present disclosure. The illustrative embodiments and descriptions thereof are intended to explain the present disclosure and do not constitute an undue limitation thereof. In the drawings.

Figure 1:
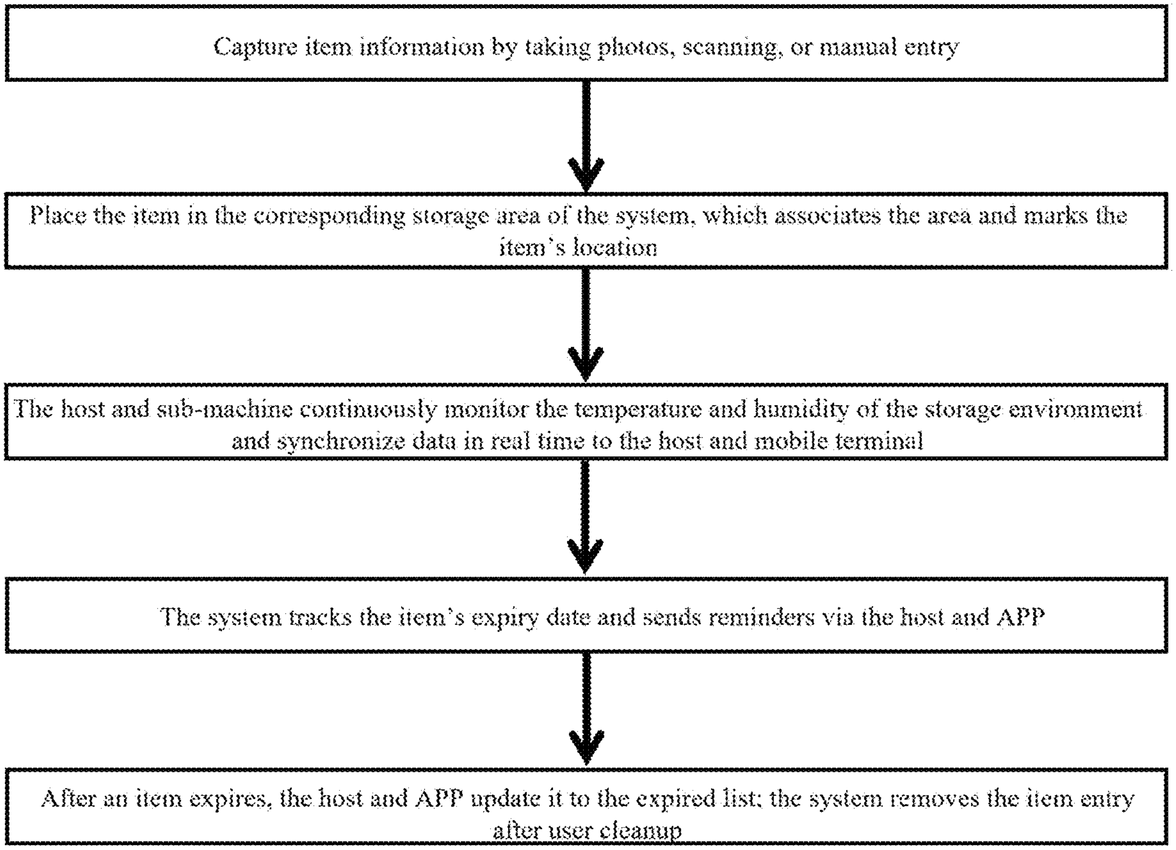
FIG. 1 is a closed-loop management flowchart of the system for household storage management according to an embodiment of the present disclosure.
Figure 2:
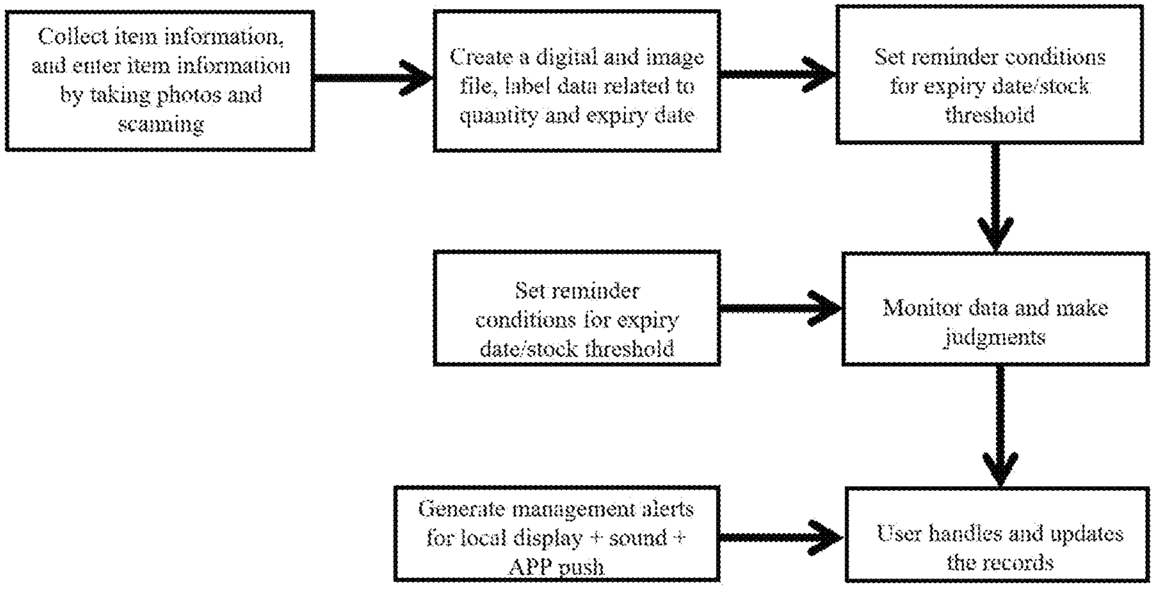
FIG. 2 is a basic flowchart of the method for household storage management according to an embodiment of the present disclosure.
Figure 3:
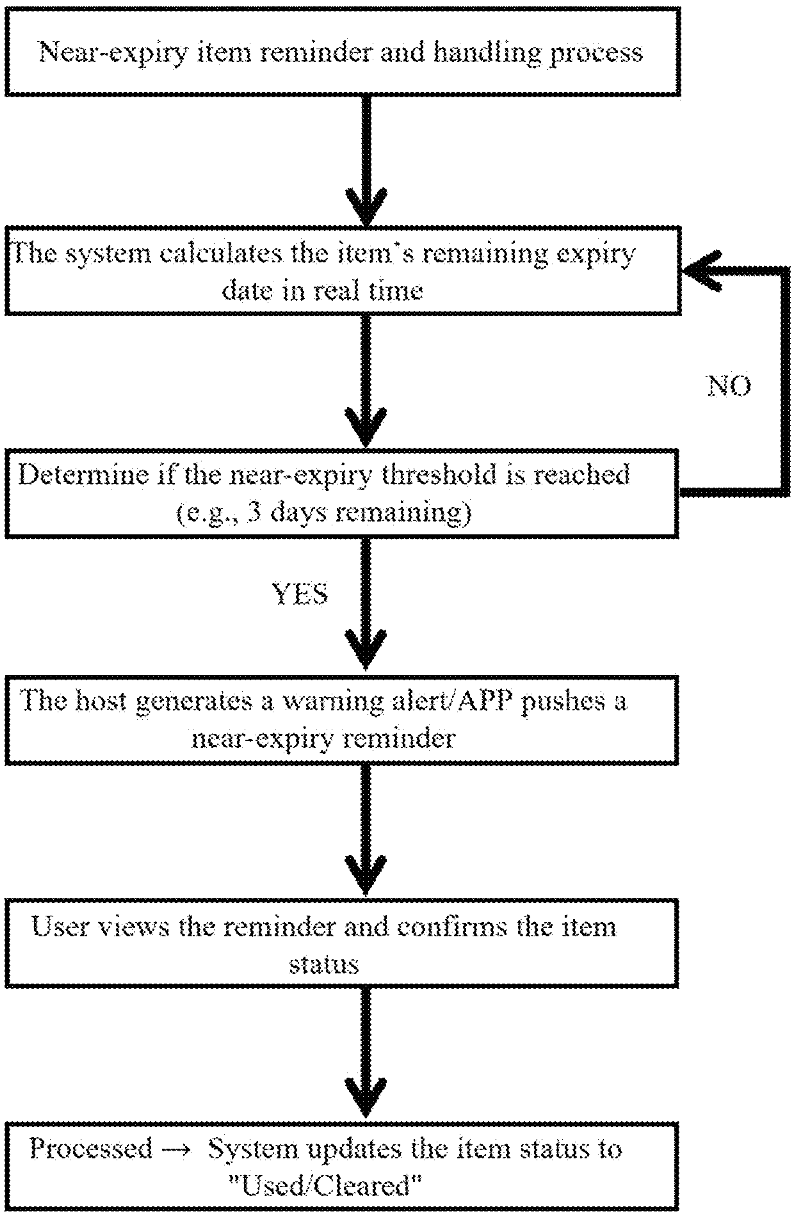
FIG. 3 is a flowchart for near-expiry item reminders and handling according to an embodiment of the present disclosure.
Figure 4:
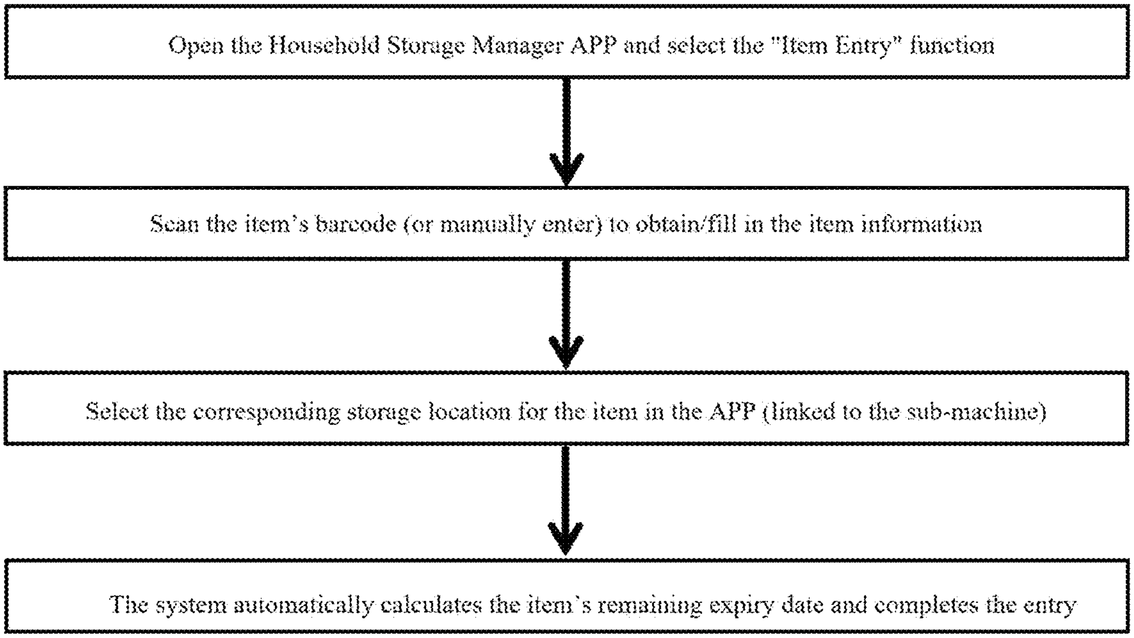
FIG. 4 is a flowchart for item entry through the mobile terminal App according to an embodiment of the present disclosure.
Figure 5:
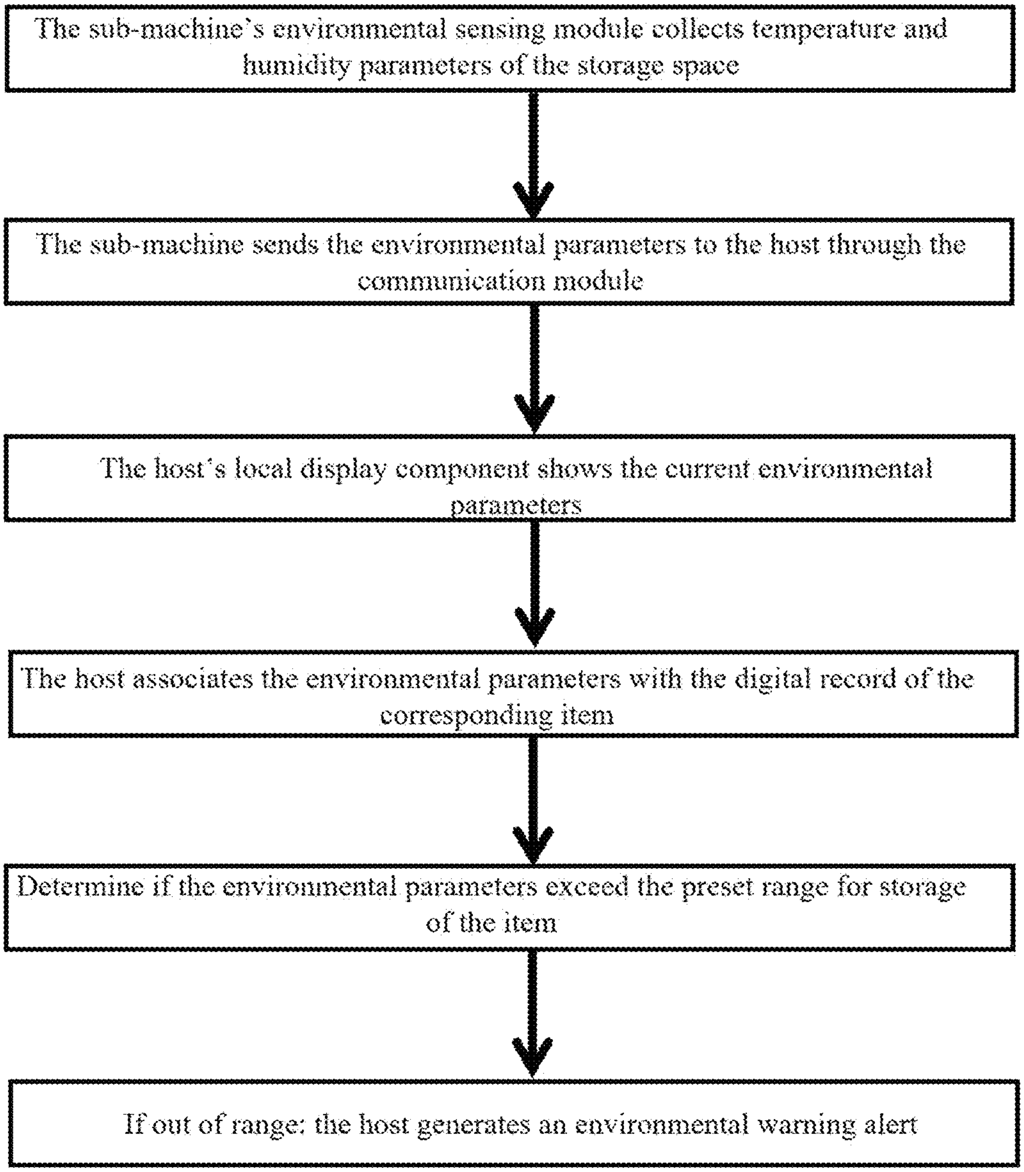
FIG. 5 is a flowchart for environmental monitoring by the sub-machine according to an embodiment of the present disclosure.

Reference signs: Host (100); Data Interface (101); Button (102); Housing (110); Upper Housing (111); Lower Housing (112); Screen Cover Glass (113); Control Module (120); Control Board (121); Signal Receiving Antenna (122); Sensing Module (130); Photographing Component (131); Sensor Assembly (132); Temperature Sensor (1321); Humidity Sensor (1322); Warning Module (140); Sound Outlet Hole (141); Display Module (150); Power Supply Module (160); Sub-Machine (200); Cover Assembly (210); Front Cover (211); Rear Cover (212); Sealing Ring (213); Protective Glass (214); Communication Control Module (220); Main Circuit Board (221); Wireless Transmission Unit (222); Environmental Sensing Module (230); Temperature Probe (231); Humidity Probe (232); Power Supply Assembly (240); Battery Compartment (241); Electrode Contact Piece (242); Screen Display Assembly (250).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms “comprising” and/or “including” are used in this specification, they specify the presence of features, steps, operations, equipment, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the present disclosure, to address the technical issues of traditional household storage methods—such as unclear item inventory, lack of expiry date control, absence of environmental monitoring, and the poor adaptability and incomplete coverage of existing smart storage solutions—a method and system for household storage management are provided. The system creates digital records through the host’s image capture and information processing core functions, enables multi-area dynamic monitoring through the sub-machine’s environmental sensing and wireless communication, and builds a closed-loop management system by combining cloud data synchronization with intelligent reminders from the mobile terminal App. Additionally, its modular and independent design adapts to various old and new storage scenarios, effectively resolving the technical shortcomings of existing solutions, such as low management efficiency, severe resource waste, and insufficient system scalability.

Please refer to FIGS. 1, 2, 3, 4, and 5. The core logic of the present disclosure is based on a method and a system for household storage management constructing a fundamental closed-loop management process of “pre-storage recording→manual updates during storage→post-storage intelligent reminders,” with the host serving as the core for data processing and management throughout. In the pre-storage phase, item information collection and record creation are completed through the host. The host is equipped with a dedicated operating system that integrates core functional modules such as item information management, data storage, and reminder rule configuration, featuring a user-friendly graphical human-machine interaction interface that supports command input through touch controls or physical buttons. When users need to store new items, they photograph the items using the host’s photographing component to capture visual information such as appearance, packaging labels, and barcodes. The operating system of the host then initiates the item information entry process: if the item packaging has a barcode, the system can automatically decode it using the built-in barcode recognition module, retrieving the item’s basic information (e.g., name, specifications) by querying a local database or online; if the item lacks a barcode or the query fails, users can manually input key information such as item name, quantity, production date, shelf life, and storage location through the manual input interface of the operating system. Upon completion, the system automatically generates a digital item record containing basic information, entry time, initial quantity, expiry date calculations, etc., stored in the host's local memory, with optional manual backup to external storage devices.

During the storage phase, the system employs manual periodic checks and data updates to ensure information accuracy. Users regularly inventory stored items, checking actual quantity changes (e.g., usage, consumption, replenishment) and shelf life status. They locate the digital record of the corresponding item in the operating system of the host and update quantity data through the edit function. If an item is partially consumed, the remaining quantity can be adjusted; if fully used or expired, the record can be marked as consumed or deleted. The operating system supports batch selection and updates, allowing users to modify multiple item records simultaneously, reducing operational complexity. In this phase, if sub-machines are deployed in specific scenarios (e.g., refrigerators, wardrobes, medicine cabinets), they continuously collect temperature and humidity data, transmitting it wirelessly to the host at regular intervals. The operating system of the host associates this environmental data with the corresponding item records, displaying it in real-time on the record details interface to help users assess storage condition suitability.

During the post-storage phase, the system manages expiry dates and inventory levels through the host's reminder function. The operating system of the host has a built-in reminder rule engine, allowing users to customize reminder thresholds when creating item profiles, such as triggering reminders when "shelf life remains 3 days" or "inventory falls below 2 items." The system also presets general reminder thresholds for items in different categories like food, medicine, and cosmetics, which users can directly apply. The operating system continuously monitors the remaining days until expiry and inventory data for all item profiles. When an item meets the preset reminder condition, the reminder mechanism is immediately triggered: the host's display module pops up a reminder window on the screen, clearly showing the item name, current status (approaching expiry/low inventory), remaining expiry date/current inventory, etc. Simultaneously, the host's warning module emits a specific-frequency beep or voice alert to ensure timely user awareness. Upon seeing the reminder, users can view the item's complete profile in the operating system, including storage location information, for quick retrieval and handling. After completion, users can mark the reminder as "processed," and the system automatically clears the reminder record.

As an extended embodiment, the present disclosure optimizes and upgrades the core logic of the above solution, with the key improvement being the introduction of item tag technology, eliminating the need for "manual periodic checks and data updates" and enabling automatic monitoring of inventory and shelf life status. Specifically, in this solution, newly added item tags use RFID or NFC tags, each corresponding to a unique item identification code. When storing new items, users must attach a tag to each item and complete the binding between the tag and the item's digital profile in the operating system of the host. The binding process involves reading the tag information through the host's radio frequency identification module and completing the association in the profile editing interface. Once bound, the host can continuously scan and monitor tag signals through its built-in recognition module. When an item is taken or replenished, the host automatically detects inventory changes through tag signal variations and updates the profile data. For shelf life monitoring, besides retaining the core logic of the original solution, the host can also confirm whether an item remains in the storage area through tag signals. If an item is taken out and not returned within a preset time, the system can issue an "item not returned" reminder to prevent loss. Other aspects of this improved solution remain consistent with the original, such as item profile creation, environmental monitoring, reminder mechanisms and other core logics.

Figure 6:
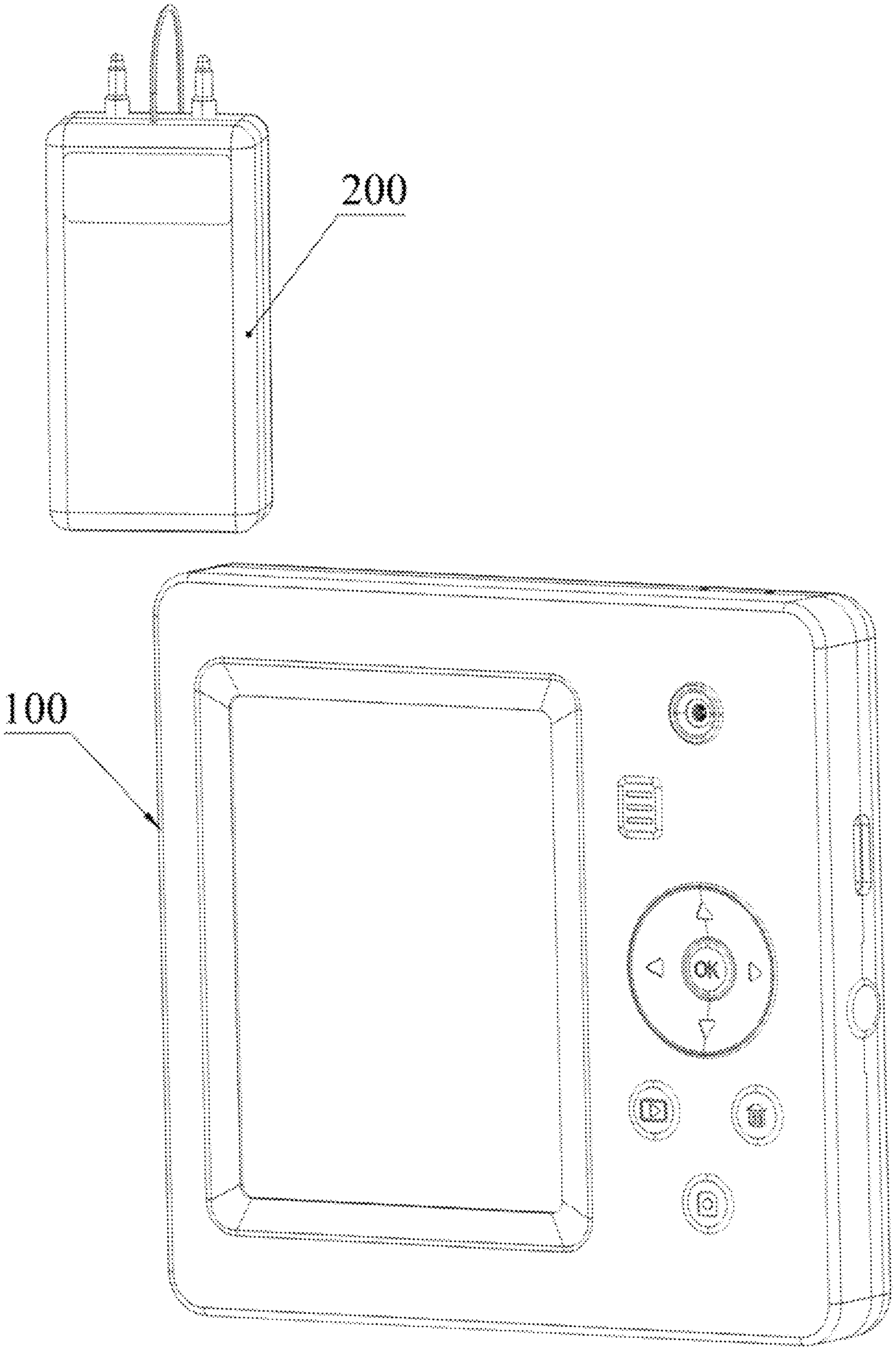
FIG. 6 is a perspective schematic diagram of an embodiment provided by the present disclosure.
Figure 7:
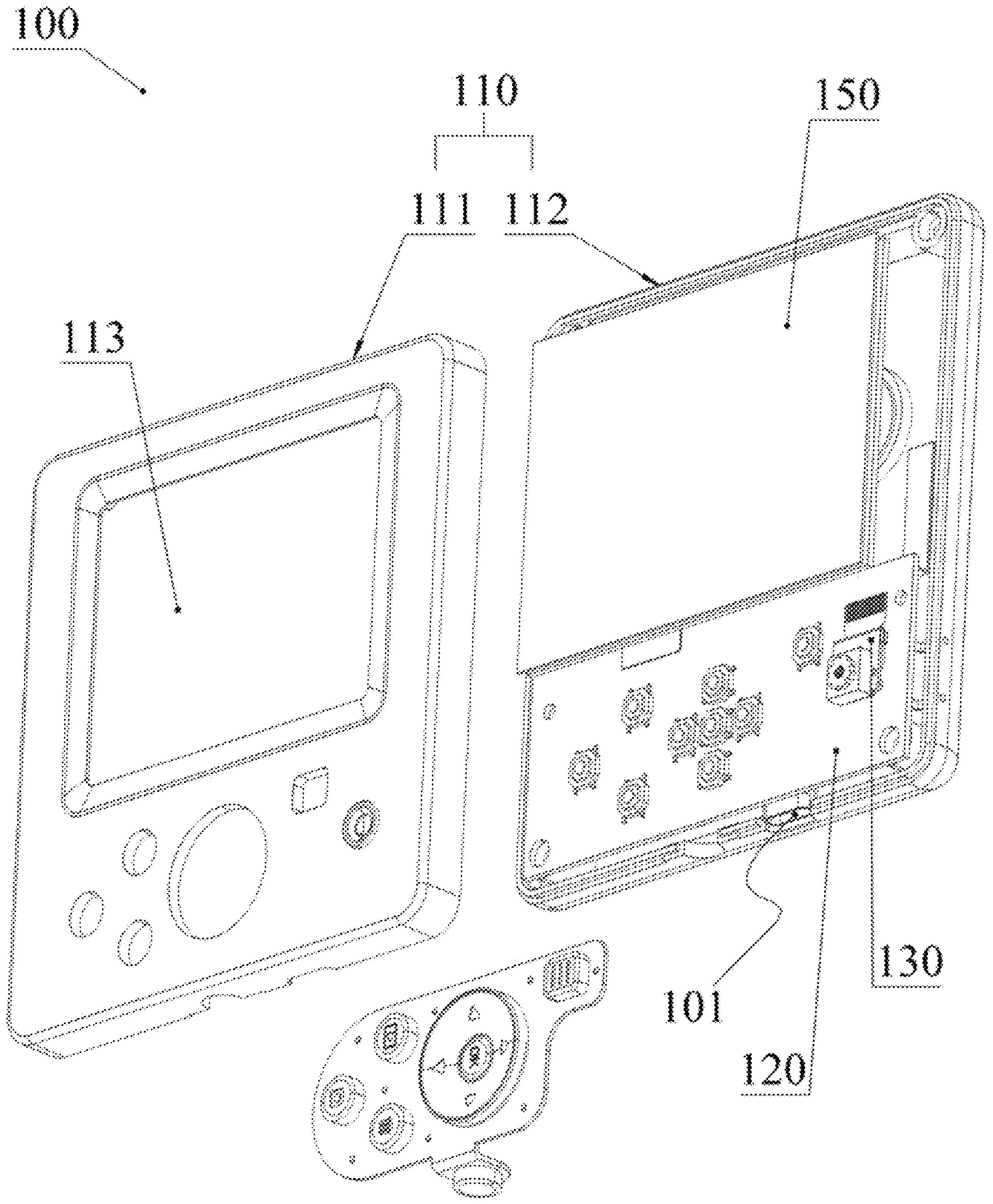
FIG. 7 is an exploded view of the host in the embodiment of FIG. 6.
Figure 8:
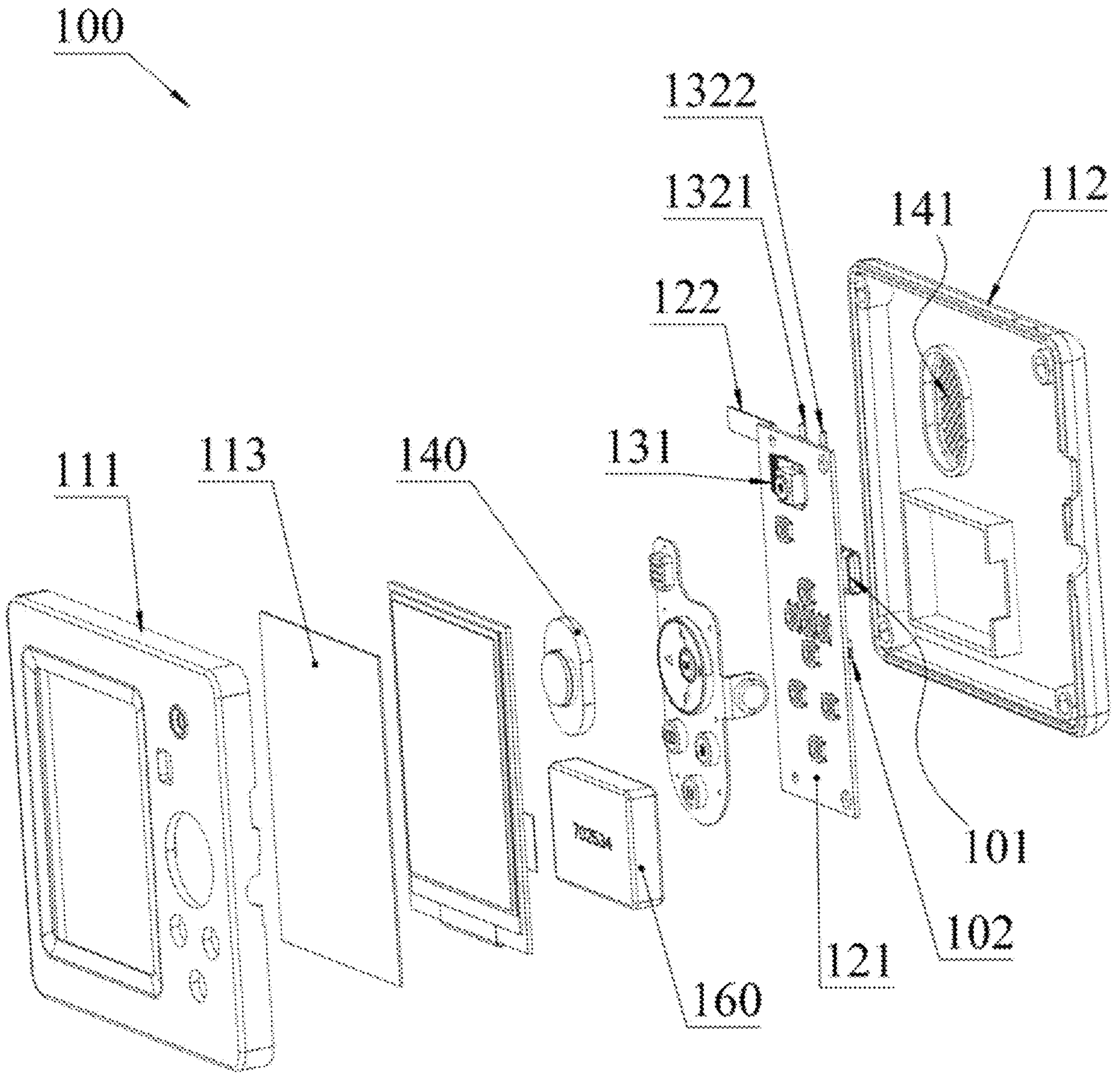
FIG. 8 is another exploded view of the host in the embodiment shown in FIG. 7.

As shown in FIGS. 6, 7, and 8, to achieve the functions of the aforementioned home storage system, the present disclosure provides corresponding hardware structure support, including the host 100. The host 100 serves as the core control terminal, handling key functions such as information collection, data processing, command execution, and human-machine interaction. The host 100 includes a housing 110, a control module 120, a sensing module 130, a warning module 140, a display module 150, and a power supply module 160. The housing 110 is configured as a square box-shaped structure, including an upper housing 111 and a lower housing 112, which are fixedly connected by bolts to form an internal installation space. This space accommodates and protects various internal electronic modules, preventing damage from dust, fingerprints, or daily wear and tear while ensuring clear visibility of displayed content and high-quality image capture. The side wall of the housing 110 is equipped with a data interface 101, which serves dual purposes: connecting to a power source to charge the built-in power supply module 160 for continuous operation, and enabling wired data transfer for high-speed data synchronization or firmware updates with external computing devices (e.g., computers, mobile phones, etc.). The side wall of the housing 110 also includes a button 102, which is electrically connected to the control module 120. Users can use this button 102 to power the device on/off or switch sleep modes, while also interacting fully with the touch functionality of the display module 150.

The control module 120 is the logical core of the entire host 100, consisting of a control board 121 and a signal receiving antenna 122. The control module 120 is fixed inside the housing 110 and is responsible for processing all input commands, executing core algorithms, managing data flow, and coordinating the collaborative work of all other modules. The control board 121 integrates a high-performance microprocessor, large-capacity memory, and peripheral circuits. The microprocessor runs the aforementioned host 100 operating system, enabling core functions such as item record management, data calculation, and reminder rule judgment. The memory stores item digital records, operating system programs, historical data, and other information, supporting local data backup and recovery. The signal receiving antenna 122 is operably connected to the control board 121, enabling wireless signal transmission and reception to establish communication links between the host 100 and external mobile terminals (e.g., smartphones) for exchanging environmental data, control commands, and other information. For expansion purposes, the control board 121 also integrates an RFID or NFC identification module to read item tag information, enabling automatic inventory updates.

In some embodiments, the control module 120 integrates or has access to a deep learning-trained AI image recognition model. This model is specifically optimized for product packaging and label text. When the photographing component 131 captures an item image, the control module 120 can not only perform traditional barcode/QR code decoding but also automatically identify the item category (e.g., "whole milk," "a certain brand of cold relief capsules"), brand, and specifications through the AI model, as well as accurately locate and recognize key text information printed on the packaging, such as production date, shelf life, and batch number. The recognized text information is converted into structured data through optical character recognition (OCR) technology, automatically filled into the corresponding fields of the digital record, and completes the expiry date calculation. This extension greatly simplifies user operations, achieves "one-shot" automated archiving, significantly improves the efficiency and accuracy of data entry, and lowers the user threshold.

The sensing module 130 is responsible for information collection, including the photographing component 131 and the sensor assembly 132. The photographing component 131 is located on the front wall of the housing 110 and, before item storage, captures multi-angle images of the item as instructed to obtain its appearance, labels, barcodes, or text information (e.g., production date, shelf life), providing a visual data foundation for creating a digital record of the item. The sensor assembly 132 includes a temperature sensor 1321 and a humidity sensor 1322, both installed on the control board 121, to monitor the temperature and humidity data of the host 100's surrounding area in real time, offering reference for environmental assessment of items stored near the host 100. The sensing module 130 converts the collected item information and environmental conditions into digital information recognizable and processable by the system, serving as the data foundation for intelligent management.

The warning module 140 is located inside the housing 110 and configured as a miniature speaker to convert electrical signals into audible warning sounds, providing warning information to users when preset alarm conditions are triggered. Multiple sound outlet holes 141 are positioned on the side wall of the housing 110 corresponding to the warning module 140 to ensure effective sound propagation without turbulence. The warning module 140 receives trigger commands from the control module 120 and converts them into audible alarm signals with specific frequencies, tones, and rhythms (e.g., intermittent beeps, chord tones, or voice prompts). Additionally, the module's logic can be extended to send system-level alarm messages to bound mobile terminals through wireless communication protocols, enabling contactless, proactive status alerts and improving user response timeliness.

The display module 150 is the core component of the host 100 for graphical human-machine interaction, responsible for information presentation and input reception. It is preferably a liquid crystal display integrated with a capacitive touch-sensing layer, entirely protected by the high-transmittance screen cover glass 113 mounted on the housing 110. The screen cover glass 113 and housing 110 together form a sealed barrier to prevent damage to internal components from dust, moisture, or scratches. Driven by the control module 120, the display module 150 dynamically renders and presents text, icons, and graphical elements in the form of a graphical user interface, including item digital record lists, storage location information, environmental parameters, expiry date status indicators, and system settings menus. Through its integrated touch function, the display module 150 detects user finger touch positions and reports coordinate data to the control module 120, enabling command input and interactive operations, providing users with a centralized and intuitive visual interaction channel. The aforementioned sensing module 130, display module 150, and warning module 140 are all in communication with the control module 120, ensuring coordinated operation through electrical connections and data bus links.

The power supply module 160 is a rechargeable lithium polymer battery housed within the housing 110, electrically connected to the control board 121 through metal spring contacts or wire connectors to form a complete power circuit. The data interface 101 also serves as the charging port for the power supply module 160. When connected to an external power source, electrical energy is regulated and processed at a constant current by the power management chip on the control board 121 to charge the battery. The power management chip also converts the battery's energy into the required voltages for each module, ensuring stable power supply and enabling the host 100 to operate independently for extended periods without an external power source. Additionally, it integrates charge-discharge protection circuits and power metering functions. The metering data is processed by the control module 120 and displayed graphically in real-time on the display module 150, showing remaining battery levels for user convenience.

In an extended embodiment of the present disclosure, the host 100 can later evolve to directly use the user's existing smartphone as a replacement, eliminating the need for additional standalone host hardware, significantly reducing system deployment costs and improving ease of use. When a smartphone serves as the host, its built-in hardware resources can fully cover the core functional requirements of the standalone host 100: the smartphone's rear or front camera replaces the photographing component 131 of the sensing module 130, used for capturing visual information such as item images and barcodes; the smartphone's processor (e.g., Snapdragon or Dimensity series chips) replaces the control board 121 of the control module 120, handling core logic such as data processing, algorithm execution, and system scheduling; the smartphone's memory and storage replace the standalone host's memory, storing item digital records, operating system programs, and historical data, while also supporting data backup and multi-device synchronization through cloud services; the smartphone's screen replaces the display module 150, providing a graphical human-machine interaction interface through a dedicated app, supporting touch operations; the smartphone's speaker and vibration module replace the warning module 140, enabling alerts through ringtones, vibrations, or push notifications; the smartphone's battery and charging module replace the power supply module 160, ensuring device endurance; the smartphone's wireless communication modules such as Bluetooth, WiFi, and NFC replace the signal receiving antenna 122, enabling wireless communication and data transmission with the sub-machine 200. In this scenario, the system's core functions are realized through a dedicated app installed on the smartphone, which integrates all modules of the original host 100's operating system. Users can directly perform operations such as item registration, record management, environmental data viewing, and alert settings through the app. Temperature and humidity data collected by the sub-machine 200 are transmitted to the smartphone through Bluetooth or WiFi, enabling associated display with item records. The smartphone-as-host solution is particularly suitable for users with limited budgets or those seeking minimalist deployment, as it leverages the user's everyday carry device to build a complete storage management system while utilizing the smartphone's mobility advantage for anytime, anywhere item management and data viewing.

Figure 9:
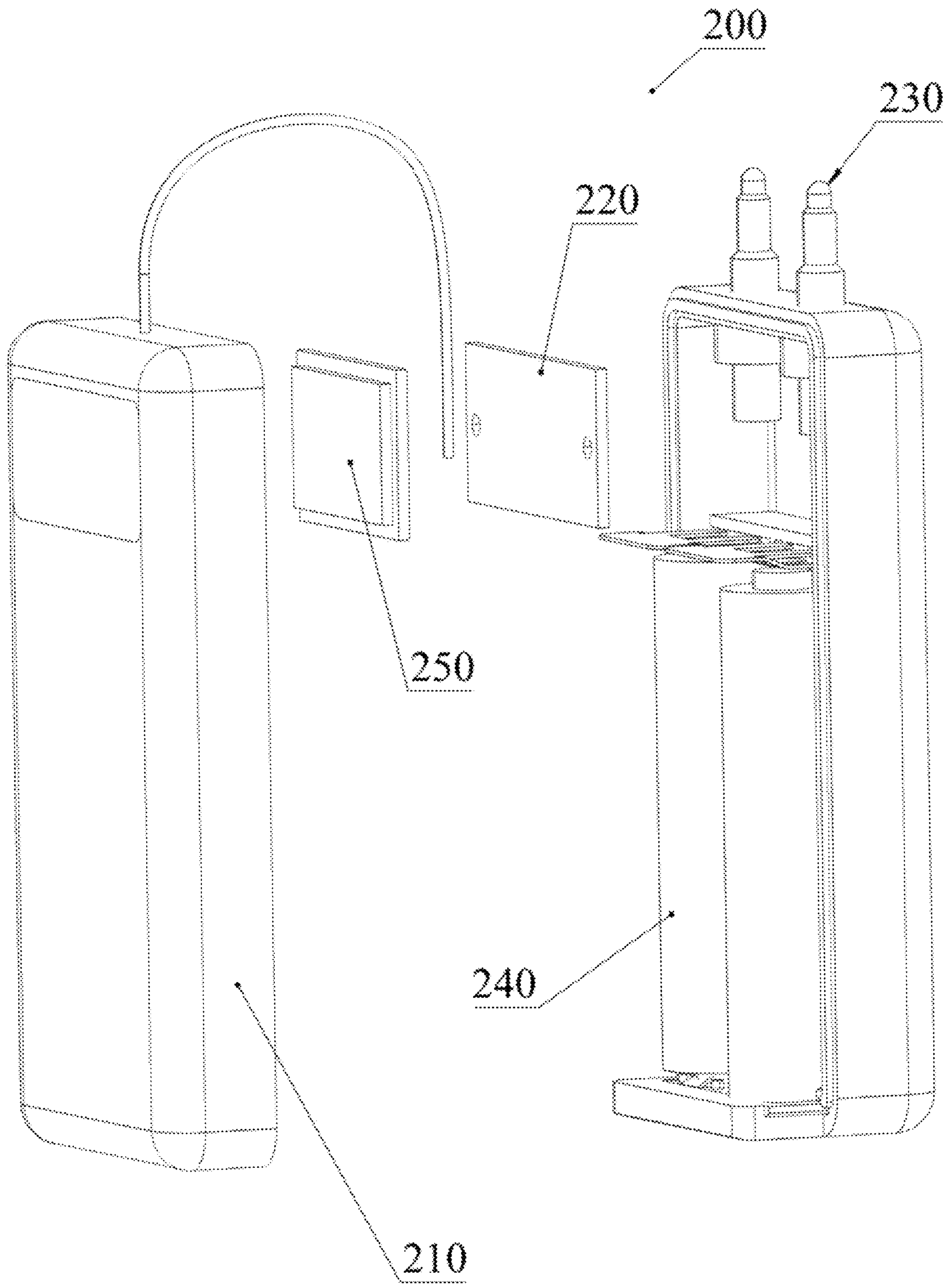
FIG. 9 is an exploded view of the sub-machine in the embodiment shown in FIG. 6.
Figure 10:
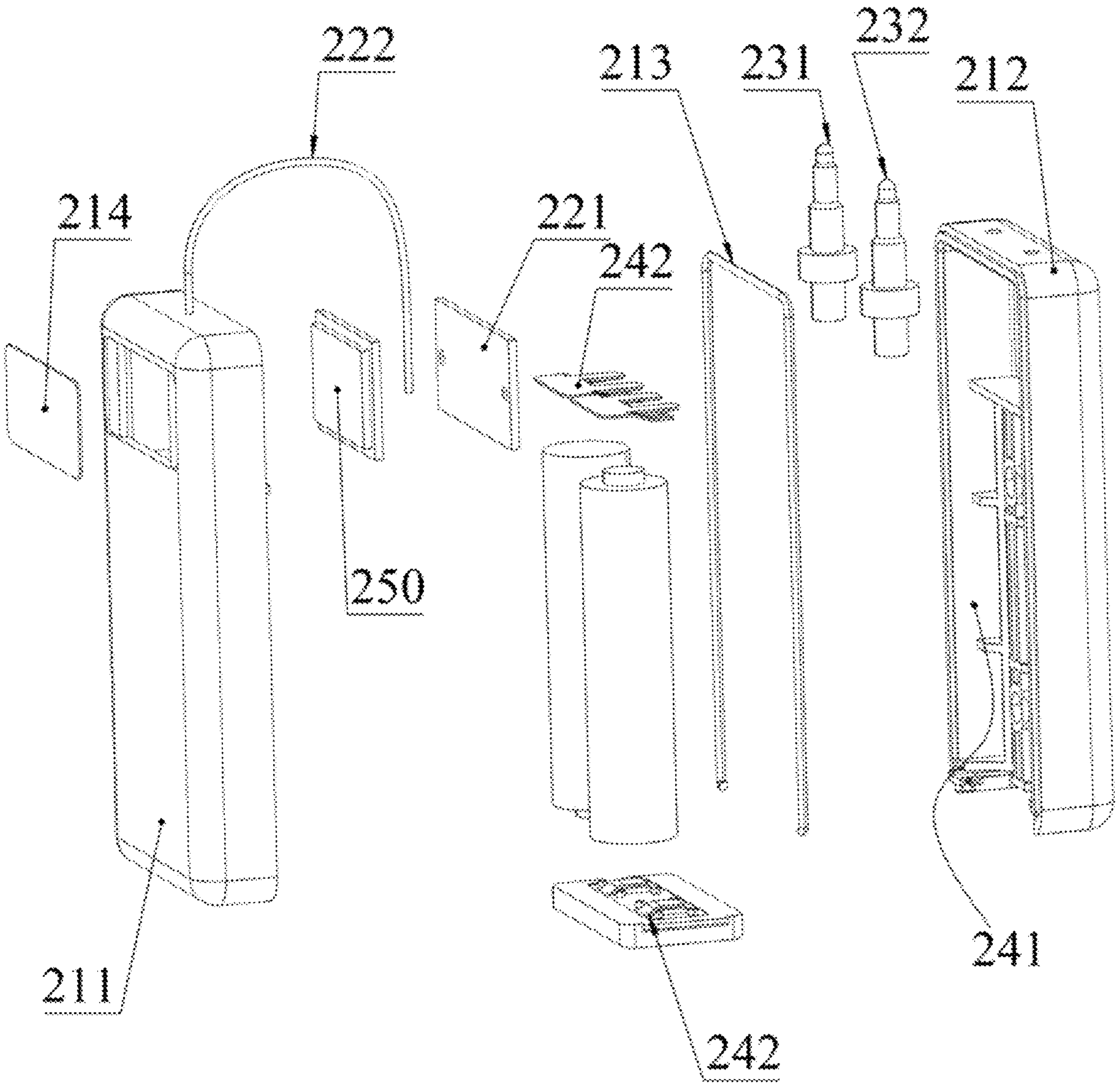
FIG. 10 is another exploded view of the sub-machine in the embodiment shown in FIG. 9.

As shown in FIGS. 9 and 10, in addition to the host structure mentioned above, in certain scenarios such as refrigerators, wardrobes, or medicine cabinets-independent enclosed or semi-enclosed storage spaces with specific temperature or humidity requirements—the system for household storage management of this disclosure can also be configured with a sub-machine 200 to achieve independent and precise monitoring of environmental conditions. The sub-machine 200 serves as a distributed environmental sensing unit, with its core function being the continuous collection of temperature and humidity parameters in its storage space and wireless transmission of the data to the host 100 or user terminal. The sub-machine 200 includes a cover assembly 210, a communication control module 220, an environmental sensing module 230, a power supply assembly 240, and a screen display assembly 250. The cover assembly 210 is designed as a square housing structure, consisting of a front cover 211 and a rear cover 212, which form a sealed internal space through a snap-fit and screw composite connection. The connecting edges of the front cover 211 and rear cover 212 are equipped with an annular sealing ring 213, which deforms under pressure after assembly to create an effective seal, enabling the sub-machine 200 to achieve an overall IP54 protection rating. This allows it to adapt to long-term stable operation in various humidity environments such as kitchens, bathrooms, and refrigerators.

The communication control module 220 is fixed inside the cover assembly 210 and includes a highly integrated main circuit board 221 and a wireless transmission unit 222 soldered onto the board. The main circuit board 221 integrates a low-power microcontroller, memory, and peripheral circuits, responsible for coordinating the operation of each unit, processing sensing data, and managing wireless communication protocols. The wireless transmission unit 222 supports wireless communication protocols such as ZigBee or Bluetooth Low Energy (BLE) Mesh, featuring an onboard antenna design optimized at the edge of the circuit board to reduce signal interference. This ensures stable, low-power data exchange with the host 100, transmitting collected environmental data to the host 100 in real time.

The environmental sensing module 230 is the core data acquisition component of the sub-machine 200. It employs a digital integrated temperature and humidity sensing chip, directly soldered onto the main circuit board 221, and includes a temperature probe 231 and a humidity probe 232. One end of each probe extends outside the cover assembly 210, ensuring the sensing elements can quickly and accurately detect changes in external temperature and humidity while avoiding measurement inaccuracies caused by heat from internal components. This enables precise collection of environmental parameters in the storage scenario.

The screen display assembly 250 is located on the front panel of the sub-machine 200, preferably using a segmented LCD display or low-power OLED screen, protected by a protective glass 214. It is primarily used for local status indication, displaying real-time key parameters such as current temperature and humidity measurements, communication status, and energy levels in a concise and intuitive format. This allows users to quickly assess the environmental conditions of their storage space without relying on the host 100.

The power supply assembly 240 provides the energy source for the sub-machine 200, including the battery compartment 241, electrode contact piece 242, and power consumption management circuit. The battery compartment 241 is located on the inner side of the cover assembly 210, designed to accommodate standard AAA batteries, and forms an electrical connection through the electrode contact piece 242 to power the sub-machine 200. The power consumption management circuit is integrated on the main circuit board 221, featuring voltage conversion, power management, and low-battery detection functions. It converts battery voltage into the system's required operating voltage and, through optimized power distribution strategies, enables the sub-machine 200 to operate continuously for 6-12 months on a single battery. The sub-machine 200, through the coordinated operation of these units, achieves precise collection, local display, and wireless transmission of environmental parameters in distributed storage spaces. Its compact design, low-power characteristics, and excellent environmental adaptability allow flexible deployment in various home storage scenarios, working with the host 100 to build a comprehensive home storage environment monitoring network.

In other embodiments, the system further expands item information management capabilities by adding calculations and records for data such as item weight, volume, and calorie content. For food items, the system can automatically retrieve and record details like calories and nutritional information through a built-in database or manual user input. For example, the system can obtain nutritional data (e.g., calories, protein, fat) from food packaging labels or barcodes and store this information in the item's digital profile, aiding users in better food management. Additionally, the system supports manual input of item weight and volume, particularly for large or heavy items, and automatically alerts users to optimize storage space. This information is integrated into item profiles for future management and optimization. For instance, when storing multiple bulky items, the system calculates whether they fit the current storage location and issues reminders if space is insufficient. For health management, the system combines food calorie data with user health records (e.g., weight, activity level) to provide personalized dietary suggestions. For example, if the system detects excessive high-calorie food in the refrigerator, it may generate "low-calorie alternative" recommendations to support healthier choices. By consolidating item weight, volume, calorie, and other data, the system not only improves item management efficiency but also delivers smarter, personalized solutions, helping reduce food waste and enhancing overall home storage and health management experiences.

In the present disclosure, the host 100 supports data interaction and collaboration with the user's mobile terminal application (App). The operating system built into the host 100 serves as the local core management platform, handling core functions such as the creation, storage, editing, and reminder rule computation of digital records. The logical functional modules of this operating system are primarily manifested as: providing comprehensive management capabilities for digital records, supporting the addition, modification, deletion, and multi-dimensional querying of records; integrating environmental data display, which can present temperature and humidity data and change curves uploaded by the host's own sensor assembly 132 and associated sub-machines 200; featuring a centralized reminder information processing interface for displaying various reminder details automatically generated by the system; and including a system settings module for managing network connections, configuring reminder thresholds, and performing data maintenance.

The host 100, through the wireless communication capabilities integrated in its control module 120, can establish a connection with the application installed on the user's mobile terminal and perform data synchronization. Specifically, the host 100 is configured to: synchronize its stored digital records, environmental monitoring data, and generated reminder information to the user's bound mobile terminal App through wireless communication or through a cloud server relay; simultaneously, the host 100 also receives instructions or data updates from the mobile terminal App (e.g., when the user remotely modifies item information through the App) and executes corresponding operations locally to ensure data consistency between both ends. The mobile terminal App, as the interface for remote access and operation by the user, relies on the aforementioned data and services provided by the host 100 for its functionality. For example, when the host 100's control module determines that an item meets the reminder condition, it generates a reminder and actively pushes it to the bound mobile terminal App, which then notifies the user through alerts or other means. The user can also send search commands to the host 100 through the App, and after performing the search, the host 100 returns the search results, including item location and environmental status, to the App for display. Additionally, the host 100 supports configuring access permissions for multiple family members, and the data it generates and maintains can be shared and collaboratively managed across multiple authorized mobile terminals after synchronization.

In other embodiments, the mobile terminal App integrates augmented reality (AR) navigation and asset visualization functions. When a user needs to locate an item, they can activate the AR navigation mode in the App, using the mobile terminal's camera to scan the room environment. Based on the sub-machine 200 location information linked in the item's digital record, combined with a pre-learned or user-annotated home space map, the system overlays intuitive navigation guidance-such as 3D arrows, path indicators, or highlighted virtual labels-on the real-time camera feed to direct the user to the target item (e.g., "inside the second drawer in the top-left corner of the cabinet"). Simultaneously, the system can generate an "asset visualization heatmap" for the entire household, displaying the total value, category density, or concentration of near-expiry items in different storage areas as color-coded zones on a home floor plan. This extension seamlessly merges abstract digital information with physical space through spatial positioning and visualization technologies, achieving a leap from "data queries" to "visual item-finding" and "spatial insights," significantly enhancing management intuitiveness and search efficiency.

In some extended embodiments, the mobile terminal App and cloud platform offer more refined family member collaboration features. The system supports creating a "family cloud space," where an administrator (e.g., the householder) can invite other family members and assign them differentiated roles and permissions, such as: parents having management rights for the medicine cabinet, children managing their toy boxes, and housekeepers having access to view daily consumable inventories. Any member's actions—taking, moving, or adding items—are synchronized in real-time and logged for transparency. The system also supports a "task assignment" feature; for example, when a reminder for a near-expiry food item is generated, a task like "consume this item within the week" can be created and assigned to a specific family member, with task statuses synced across all members. This extension transforms individual storage behaviors into efficient, orderly family-wide collaboration through digital roles, permissions, and task flows, greatly improving the coherence, accountability, and execution of household management.

Based on the above system, the method for household storage management provided by the present disclosure mainly includes the following steps: Step 1, pre-storage preparation, where the photographing component 131 of the sensing module 130 in the host 100 captures item image information; Step 2, creating a digital record, where the host 100 operating system adds item information such as name, quantity, and shelf life through automatic identification or manual entry, generating and storing a digital item record; Step 3, storage deployment, where items are placed in designated storage locations. If a sub-machine 200 is deployed at the location, the host 100 establishes a connection with the sub-machine 200 through wireless communication, recording the environmental monitoring node of the item's location; Step 4, in-storage management, where manual periodic checks of item status are conducted, updating inventory and shelf life information in the host 100 operating system, while the environmental sensing module 230 of the sub-machine 200 continuously collects environmental parameters and transmits them to the host 100; Step 5, reminder generation and output, where the host 100 operating system determines whether preset reminder conditions are met based on the expiry date data in the digital item record and the environmental parameters transmitted by the sub-machine 200. If conditions are met, reminder information is output through the display module 150 and warning module 140 of the host 100, while also syncing to the mobile terminal App; Step 6, post-storage processing, where users handle items (e.g., retrieval or disposal of expired items) based on reminders and update the item record status in the host 100 operating system or App, completing the entire storage management loop.

In other embodiments, the present disclosure can also perform intelligent analysis and prediction of household consumption patterns based on warehousing and consumption (marked as reduced or used up after retrieval) data of long-term accumulated items. The control module 120 or cloud server is configured to analyze the historical consumption rate of specific items (e.g., groceries, paper towels, pet food, or common medications) and predict the remaining days of supply based on current inventory. When the predicted remaining days fall below a user-set "replenishment reminder threshold," the system automatically generates replenishment suggestions and adds the item information (including suggested replenishment quantity) to the "Smart Shopping List" in the mobile terminal App. Additionally, the system can comprehensively analyze information of all items approaching the expiry date thereof to generate a "Priority Use List," marked in the shopping list to guide consumption decisions and avoid duplicate purchases or resource waste. This extension intelligently links household inventory management with procurement planning, achieving end-to-end resource optimization from internal management to external supply.

In other embodiments, the system for household storage management of the present disclosure can further synchronize data with smart home appliances (such as smart refrigerators, temperature-controlled wine cabinets, dehumidifiers, humidifiers, fresh air systems, etc.) in the home environment, forming an active item preservation and environmental regulation system. Specifically, the control module 120 of the host 100 is further configured to: intelligently determine whether the current environment falls within the optimal storage condition range for the item category (e.g., "red wine," "premium tea," "delicate fruits/vegetables," or "specific medications") based on the category information in the item's digital profile and the environmental parameters obtained in real-time from associated sub-machines 200. If the judgment is negative, the control module 120 can send control instructions containing target parameters (e.g., target temperature, target humidity) to the corresponding smart appliances through its wireless communication module. For example, when the system detects that red wine is stored in a monitored area of a sub-machine 200 and the environmental temperature exceeds 18° C., it can automatically send a command to the smart temperature-controlled wine cabinet in that area to adjust its internal temperature to the suitable range of 12-18° C. This expansion from "passive monitoring and alerts" to "active intervention and regulation" achieves closed-loop precision control of the storage environment, fundamentally maximizing the effective lifespan and freshness of items.

To illustrate the practical operation process and effectiveness of the present disclosure, the following examples are provided based on common home storage scenarios, assuming the system is already installed in a home environment, with the host 100 placed in a central area such as the living room or kitchen, and the sub-machines 200 deployed in specific scenarios like refrigerators, medicine cabinets, and wardrobes.

In the food storage scenario, for example, when a user buys a carton of milk, they first place the milk in front of the photographing component 131 of the host 100 and activate the "Add New Record" function in the operating system of the host 100. The photographing component 131 captures the barcode on the milk bottle, and the system automatically identifies and retrieves the milk's name, specifications, production date, and shelf life. After the user confirms the information in the operating system and manually enters the initial quantity as "1 carton," the system automatically calculates the remaining expiry date as 20 days, generates a digital item record, and stores it. The user then places the milk in the refrigerator compartment where a sub-machine 200 is deployed. The host 100 identifies the sub-machine 200's signal through wireless communication, and the user associates the storage location with "Refrigerator Compartment Sub-machine 200" in the record editing interface. During subsequent storage, the user conducts weekly inventory checks of the fridge and finds half a carton of milk consumed. They locate the milk's record in the host 100's operating system and update the quantity to "0.5 cartons." When the milk's remaining expiry date reaches 3 days, the host 100's operating system triggers a reminder mechanism: the display module 150 pops up a reminder window stating "Milk will expire in 3 days, please use it promptly," the warning module 140 emits intermittent beeps, and the mobile terminal app receives a push notification. Upon seeing the reminder, the user takes the milk from the fridge and consumes it. After finishing, they mark the record as "Consumed" in the host 100's operating system, and the system automatically archives the record. Throughout this process, the sub-machine 200 in the fridge continuously collects temperature data through the environmental sensing module 230 and transmits it to the host 100. The operating system displays the temperature curve in real time. If the temperature is detected to exceed 4° C., a reminder is issued: "Abnormal fridge temperature, please ensure food freshness."

In an extended embodiment of this food storage scenario, the system can automatically generate tailored recipe recommendations based on the digital records of remaining ingredients in the refrigerator, addressing users' "what to eat" dilemma and reducing food waste. During implementation, when creating item profiles for food category items, the system additionally collects and records core attributes of ingredients, including category (e.g., meat, vegetables, dairy, grains, condiments), ingredient state (e.g., fresh, frozen, dried), edible portions, estimated weight, etc. Examples include detailed entries like "500 g pork belly (fresh)", "3 green peppers (fresh)", "1 kg rice (dried)", "1 bottle of soy sauce (½ remaining)". The host 100 or cloud server integrates a vast recipe database containing hundreds of thousands of home-style, regional, and specialty dishes, each annotated with detailed ingredient lists (including category and quantity range), cooking steps, required utensils, estimated time, flavor profile (e.g., spicy, mild), nutritional information, and cooking tips. When users trigger the "Recipe Recommendation" feature through host 100 or the app, the system executes a smart matching algorithm: First, it extracts the categories and available quantities of all remaining ingredients in the refrigerator and compares them with the "essential ingredient lists" of each recipe in the database, filtering out recipes missing critical ingredients (e.g., lacking pork for fish-flavored shredded pork). Next, it ranks recipes based on the match between available ingredient quantities and recipe requirements, prioritizing those with exact matches or minimal supplementary needs. It then uses sub-machine 200's temperature and humidity data to assess ingredient freshness, promoting recipes for soon-to-expire items (e.g., tofu expiring in 1 day) to encourage their use. Finally, it further refines recommendations by incorporating users' browsing history, saved recipe styles, and household taste preferences (e.g., "no spicy food" settings). For instance, with 0.5 cartons of milk, 3 eggs, 200 g flour, and 50 g sugar remaining, the system would prioritize recipes like "milk egg custard", "milk flour pancakes", or "egg-stuffed pancakes". Selecting a recipe displays a detailed ingredient comparison (e.g., "milk egg custard requires 200 ml milk (250 ml remaining, sufficient), 2 eggs (3 remaining, sufficient)"), step-by-step cooking instructions, and preparation tips (e.g., "beat eggs in advance") with timers. For recipes missing non-essential ingredients (e.g., scallions for tomato scrambled eggs), the system suggests substitutes (e.g., "replace chopped green onion with cilantro") and prompts users as whether to add missing non-essential items to their "shopping list". Additionally, the system supports precise "search recipes by ingredient" queries, e.g., searching "pork belly recipes" to display all dishes where pork belly is the core ingredient, indicating which can be made with existing ingredients.

In the scenario of medication storage, for example, after a user purchases a course of cold medicine, since the medicine box lacks a barcode, they manually activate the "Add New Record" function in the host 100 operating system. They input the medication name as "Certain Brand of Cold Relief Capsules," quantity as "1 box," production date as "May 1, 2025," and shelf life as "2 years." The system automatically calculates the expiration date as May 1, 2027, and the user sets a custom reminder threshold of "7 days in advance" to complete the record setup. The user places the medication in the medicine cabinet, where the deployed sub-machine 200 establishes a connection with the host 100, and the storage location in the record is updated to "Medicine Cabinet Sub-machine 200." During storage, the user periodically checks the cabinet every month and finds that 3 packets have been consumed, leaving 7 packets. They update the quantity to "7 packets" in the operating system.

When the medication is 7 days away from expiration, the display module 150 and warning module 140 of the host 100 issue a reminder, and the app simultaneously pushes a notification. Meanwhile, the Medicine Cabinet Sub-machine 200 continuously monitors temperature and humidity through the environmental sensing module 230. If a reading shows humidity exceeding 60%, the system alerts, "Abnormal humidity in the medicine cabinet may affect drug efficacy," prompting the user to take anti-humidity measures promptly. After the medication expires, the system moves its record to the "Expired List," and the user deletes the record from the operating system after disposal.

In an extended embodiment of this medication storage scenario, the system can provide safe medication recommendations based on user-input symptom information combined with the digital records of stored medications, assisting users in quickly matching suitable drugs while avoiding medication risks. The core of this functionality lies in constructing detailed medication profiles and an intelligent medication-matching engine. First, when creating a digital medication profile, the system collects data far beyond basic information by scanning drug approval numbers or manual entry, including generic names, brand names, active ingredients, indications (e.g., "relieves fever, headache, and nasal congestion caused by common cold"), dosage (e.g., "adults take 1 sachet per dose, 3 times daily"), contraindications (e.g., "prohibited for pregnant women" or "prohibited for those allergic to acetaminophen"), adverse reactions (e.g., "occasional rash or nausea"), precautions (e.g., "avoid alcohol during medication"), drug interactions (e.g., "do not take with other antipyretic analgesics"), dosage form (e.g., capsules, tablets), manufacturer, approval number, and other critical details. This information is prioritized from authoritative databases like the National Medical Products Administration to ensure accuracy and safety. Simultaneously, the system allows users to input personal health records, including age, gender, weight, allergy history (e.g., "penicillin allergy"), underlying conditions (e.g., "hypertension, diabetes"), pregnancy or lactation status, etc., which serve as vital safety references for medication recommendations. When users experience discomfort and need medication, they can input symptoms (e.g., "fever 38.5° C., headache, nasal congestion, runny nose") through the host 100 or the App's "Medication Consultation" feature. The system first uses symptom recognition algorithms to preliminarily diagnose possible conditions (e.g., "common cold" or "flu"), then filters medications from the database whose indications match the symptoms or preliminary diagnosis, generating a candidate list. Next, the system performs safety checks: filtering out contraindicated drugs based on user health records (e.g., excluding "pregnancy-prohibited" cold medicines for pregnant users); screening for adverse interactions with current medications (e.g., if the user is taking "Tylenol," excluding cold capsules containing acetaminophen); and adjusting dosage recommendations by age or weight (e.g., halving adult doses for children). Finally, the system displays matched medications, each annotated with details like "recommendation score," "symptom match rate," "dosage advice," "precautions," and "adverse reaction alerts." For instance, for "common cold" symptoms, it may recommend "Certain Brand of Cold Capsules" with a note: "adults take 1 sachet per dose, 3 times daily; avoid alcohol and other antipyretics during use." A prominent disclaimer is displayed: "This recommendation is for reference only based on drug labels and cannot replace professional diagnosis by doctors or pharmacists. Seek medical attention if symptoms persist." If multiple symptoms match multiple drugs, the system warns against "concurrent use of similar-effect medications" and recommends either a single optimal drug or a combined regimen.

In the extended clothing storage scenario, such as when users organize seasonal clothes, an RFID tag is attached to each item. The "Add New Record" function is initiated in the host 100 operating system, and the tag information is read by the identification module of the control module 120. The user manually inputs the item name "Wool Coat," purchase date "October 2024," and storage location "Upper Wardrobe," while setting a custom rule for "Reminder to inspect after 3 months of storage." The system generates an item record linked to the tag. The user places the clothing in the wardrobe, where the sub-machine 200 establishes communication with the host 100 and transmits real-time humidity data inside the wardrobe through the environmental sensing module 230. During storage, the host 100 senses whether the item remains in the wardrobe through tag recognition, eliminating the need for manual periodic checks. When the 3-month storage period is reached, the system issues a reminder. After inspecting the item's condition, the user updates the record status in the operating system to "Checked, no mold" and resets the reminder cycle. If the sub-machine 200 detects wardrobe humidity exceeding 70%, the system alerts with "Wardrobe humidity too high, please protect items from moisture," prompting the user to activate dehumidification equipment promptly.

In an extended embodiment of this clothing storage scenario, the system can provide users with personalized outfit combination suggestions based on recorded clothing information, addressing issues such as "outfit selection difficulties" and low clothing utilization. To achieve this function, the creation of digital clothing records requires collecting richer attribute information. In addition to basic details like name and storage location, core outfit attributes must be meticulously recorded: category (e.g., tops, pants, jackets, skirts, shoes, accessories), style (e.g., casual, formal, sporty, vintage, sweet), color (e.g., black, white, navy, burgundy), primary tone (cool, warm, neutral), material (e.g., wool, cotton, synthetic fiber, leather), seasonal suitability (e.g., spring/autumn, winter, summer), occasion (e.g., commuting, dating, sports, gatherings), neckline type (e.g., round neck, V-neck, collar), sleeve length (e.g., long sleeve, short sleeve, three-quarter sleeve), and cut (e.g., fitted, loose, straight). Users can quickly input this information through built-in classification options in the app or by taking photos of clothing items, allowing the AI image recognition model to automatically identify certain attributes (e.g., color, category, style). Simultaneously, the system supports users in inputting personal outfit preferences, including commonly used styles, disliked color combinations, body type characteristics (e.g., "pear-shaped," "broad shoulders"), scenario needs (e.g., "daily commute," "weekend outings"), and seasonal preferences. Users can also authorize the system to access local weather data (e.g., temperature, weather conditions, wind speed). The core of the system is the outfit rule engine, which integrates fundamental fashion principles (e.g., color coordination like "monochromatic matching" or "contrast pairing," material combinations like "wool+cotton for comfort," and style consistency) with personalized needs, generating suitable outfit combinations based on multi-dimensional conditions. For example, when a user needs a "Monday commute outfit" and the day's weather is "15° C., cloudy," the system will combine the user's settings like "preference for smart-casual workwear" and "pear-shaped body suits A-line skirts" to filter items from the clothing record, such as a "navy blue blazer (smart-casual, spring/autumn)," "white shirt (commute, long sleeve)," "khaki A-line skirt (fitted, spring/autumn)," and "black low-heeled shoes (commute)," assembling them into a complete outfit. If the user owns a "red scarf" accessory, the system may suggest "adding a red scarf to brighten the overall look." When displaying outfit suggestions, the system presents each item's name and storage location (e.g., "blazer in the middle-left section of the wardrobe") in a format of combination of graphics and text, highlighting outfit strengths (e.g., "A-line skirt flatters pear-shaped figures, blazer enhances formality") and suitability reasons (e.g., "15° C. is ideal for layering a blazer over a shirt"). The system also supports an "outfit calendar" feature, allowing users to plan and save weekly outfits in advance, with daily push of reminders. Quick scenario-based searches, such as "date outfit" or "sporty outfit," yield corresponding suggestions. Additionally, based on sub-machine 200's collected wardrobe temperature and humidity data, the system may include practical tips like "this item has been stored for 1 month—consider ironing before wearing" or "recent humidity is high—air out after wearing." Users can save favorite outfits, and the system continuously optimizes recommendations based on collection records, increasingly aligning with the user's style.

In summary, the present disclosure achieves the following technical effects: Compared to traditional storage methods relying solely on manual recording and memorization, the basic solution of this disclosure establishes a standardized storage management process. Leveraging the host 100 operating system, it enables standardized recording and intelligent reminders for item information, preventing items such as ingredients, medicines, and cosmetics from being forgotten and expiring, significantly improving item utilization and safety. The extended solution further eliminates the tedious steps of manual periodic inspections by introducing item tagging technology, achieving automatic updates of inventory and enhancing management efficiency. Traditional storage relies on manual recording and item searches, which are time-consuming and error-prone. This disclosure simplifies data entry through technologies like barcode recognition and AI image recognition, while the search function in the mobile terminal App allows quick item location, greatly improving entry and retrieval efficiency. Multi-device collaboration and family-sharing features enable multiple household members to manage the same inventory simultaneously, avoiding duplicate purchases and missed items, thereby improving overall storage efficiency. The distributed deployment of sub-machine 200 enables precise environmental monitoring for different storage scenarios, providing suitable environmental conditions for item storage and reducing the risk of damage due to unsuitable environments. The host 100 and sub-machine 200 adopt a modular design, allowing the number of sub-machines 200 to be adjusted as needed. The flexible wireless communication solution covers larger indoor environments, whether for refrigerators, wardrobes, bookshelves, or storage cabinets, making the system easy to deploy. Compared to traditional smart cabinets that can only retrofit specific compartments, this disclosure offers better versatility and scalability. Unlike existing smart storage technologies requiring complex mechanical structures, this disclosure primarily relies on electronic sensing and software algorithms to achieve intelligent functions, with relatively simple hardware structures. The wireless solution and software upgrades reduce reliance on complex mechanisms, thereby lowering overall costs and maintenance difficulty.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A method for household storage management, comprising the following steps of:

providing a host, the host comprising:

a control module comprising a microprocessor;

a sensing module comprising a photographing component communicatively coupled to the control module;

a graphical user interface coupled to the control module and comprising a display module configured to present information and physical buttons or a touch-sensing layer or configured to detect a user finger touch; and a warning module communicatively coupled to the control module and configured to issue perceptible warning information;

providing one or more sub-machines for deployment at corresponding storage locations, each of the one or more sub-machines comprising:

an environmental sensing module configured to collect environmental parameters comprising temperature data and humidity data of the corresponding storage location; and a communication control module configured to transmit the environmental parameters to the host;

collecting item information for each item of a plurality of items, the item information comprising at least one of quantity or expiry date of items, wherein said collecting item information of each item of the plurality of items comprises;

activating, by the control module, a function for adding a new record;

capturing, by the photographing component, an image of an item;

attempting to identify, by the control module, a barcode or QR code from the image of the item;

attempting to retrieve, by the control module, the item information from a database based on the barcode or QR code if the barcode or QR code is identified; and if the barcode or QR code failed to be identified from the image or if the item information failed to be retrieved from the database, receiving, by the graphical user interface; a manual input of the item information from a user;

receiving, by the control module, information of storage location of the item, and adding the information of storage location of the item to the item information;

creating, by the control module, digital and image records for each item of the plurality of items based on said collected item information, the digital and image records comprising at least data related to the quantity and/or expiry date of the items;

associating, by the control module, the digital and image records of the items with a corresponding sub-machine of the one or more sub-machines based on the information of storage location of each of the items;

receiving, by the control module from a sub machine of the one or more sub-machines, environmental parameters comprising temperature data and humidity data of the storage location associated with the sub-machine;

associating, by the control module, said received environmental parameters with the digital and image records corresponding to the items having the storage location, corresponding to the sub-machine from the environmental parameters received, in the item information of the respective item;

setting by the control module a reminder condition according to the data related to the quantity and/or expiry date in the digital and image records;

setting, by the control module, a reminder condition according to the environmental parameters in the digital and image records;

monitoring, by the control module, the data related to the quantity and/or expiry date together with the environmental parameters associated with the digital and image records, and determining by the control module, whether the reminder condition is met;

when said monitored data related to the quantity and/or expiry date meets the reminder condition according to the data related to the quantity and/or expiry date, automatically generating and outputting, by the control module, management reminder information, and pushing the management reminder information to a client by at least one of the following methods: the display module, a sound reminder on the warning module, or by wireless communication to bound mobile terminals, thereby prompting a user to manage the items; and when the monitored environmental parameters meet the reminder condition according to the environmental parameters, automatically generating and outputting, by the control module, management reminder information, and pushing the management reminder information to a client by at least one of the following methods: the display module, a sound reminder on the on the warning module, or by wireless communication to bound mobile terminals, thereby prompting a user to manage the items.

2. The method for household storage management according to claim 1, wherein the step of creating digital and image records for each item based on the collected item information comprises: obtaining basic information of the items, the basic information containing at least production date or shelf life information for determining the data related to expiry date.

3. The method for household storage management according to claim 1, wherein the step of setting a reminder condition according to the data related to the quantity and/or expiry date in the digital and image records comprises: setting an expiry date reminder threshold and/or a stock reminder threshold; the step of monitoring the data to determine whether the reminder condition is met comprises: comparing the data related to expiry date with the expiry date reminder threshold, and/or comparing the data related to quantity with the stock reminder threshold.

4. The method for household storage management according to claim 1, wherein the step of outputting management reminder information comprises: generating visual reminder information for local display; and/or generating an audible warning signal; and/or sending the reminder information to a mobile terminal.

5. The method for household storage management according to claim 1, further comprising: receiving manually input item information related to name, quantity, production date, and/or shelf life from the user for creating or updating the digital and image records.

6. The method for household storage management according to claim 5, wherein item-by-item inputs for the name, quantity, production date, and/or shelf life of the items is received through a human-machine interaction interface, and relevant information in the digital and image records is updated.

7. The method for household storage management according to claim 1, further comprising: when creating or updating the digital and image records, automatically matching and applying a preset general reminder threshold for a category of the items as the reminder condition based on the category of the items.

8. The method for household storage management according to claim 1, further comprising: when automatically generating management reminder information, relevantly recording generation time and a trigger reason of a current reminder in the digital and image records.

9. The method for household storage management according to claim 1, further comprising: predicting remaining usage time of the items based on a historical consumption quantity thereof in the digital and image records, and generating replenishment reminder information when the predicted remaining usage time is below a preset replenishment threshold.

10. The method for household storage management according to claim 1, the method further comprising:

extracting, by the control module, categories and available quantities of all the plurality of items as possible ingredients, comparing, by the control module, the extracted categories and available quantities of all the plurality of items with a list of ingredients for each of a plurality of recipes;

filtering out, by the control module, recipes of the plurality of recipes that contain ingredients missing from the plurality of items; and providing, by the control module, a recipe that contains an ingredient corresponding to an item of the plurality of item that meets a condition according to the data related to the expiry date.

11. A system for household storage management, comprising:

a host, the host comprising:

a control module comprising a microprocessor;

a sensing module comprising a photographing component communicatively coupled to the control module;

a graphical user interface coupled to the control module and comprising a display module configured to present information and physical buttons or a touch-sensing layer or configured to detect a user finger touch; and a warning module communicatively coupled to the control module and configured to issue perceptible warning information; and one or more sub-machines for deployment at corresponding storage locations, each of the one or more sub-machines comprising:

an environmental sensing module configured to collect environmental parameters comprising temperature data and humidity data of the corresponding storage location; and a communication control module configured to transmit the environmental parameters to the host;

wherein the host is configured to:

collect item information for each item of a plurality of items, the item information comprising at least one of quantity or expiry date of items, wherein the control module is configured to collect said item information of each item of the plurality of items by:

activating a function for adding a new record;

causing the photographing component to capture an image of an item;

attempting to identify a barcode or QR code from the image of the item;

attempting to retrieve the item information from a database based on the barcode or QR code if the barcode or QR code is identified; and if the barcode or QR code failed to be identified from the image or if the item information failed to be retrieved from the database, causing the graphical user interface to receive a manual input of the item information from a user;

receiving information of storage location of the item, and adding the information of storage location of the item to the item information;

creating digital and image records for each item of the plurality of items based on said collected item information, the digital and image records comprising at least data related to the quantity and/or expiry date of the items;

associating the digital and image records of the items with a corresponding sub-machine of the one or more sub-machines based on the information of storage location of each of the items;

receiving from a sub machine of the one or more sub-machines, environmental parameters comprising temperature data and humidity data of the storage location associated with the sub-machine;

associating said received environmental parameters with the digital and image records corresponding to the items having the storage location, corresponding to the sub-machine from the environmental parameters received, in the item information of the respective item;

setting a reminder condition according to the data related to the quantity and/or expiry date in the digital and image records;

setting a reminder condition according to the environmental parameters in the digital and image records;

monitoring the data related to the quantity and/or expiry date together with the environmental parameters associated with the digital and image records, and determining whether the reminder condition is met;

when said monitored data related to the quantity and/or expiry date meets the reminder condition according to the data related to the quantity and/or expiry date, automatically generating and outputting, by the control module, management reminder information, and pushing the management reminder information to a client by at least one of the following methods: the display module, a sound reminder on the warning module, or by wireless communication to bound mobile terminals, thereby prompting a user to manage the items; and when the monitored environmental parameters meet the reminder condition according to the environmental parameters, automatically generating and outputting, by the control module, management reminder information, and pushing the management reminder information to a client by at least one of the following methods: the display module, a sound reminder on the on the warning module, or by wireless communication to bound mobile terminals, thereby prompting a user to manage the items.

12. The system for household storage management according to claim 11, wherein the control module of the host is further configured to:

when judging that the environmental parameters exceed a preset safety range for a storage location, generate environmental warning reminder information containing environmental status abnormity, and output the environmental warning reminder information through the display module and/or the warning module.

13. The system for household storage management according to claim 11, wherein the control module is configured to:

decode the barcode or the QR code and query a database to obtain at least one piece of information related to name, production date, or shelf life of the items.

14. The system for household storage management according to claim 11, wherein the control module is configured to:

pop up a reminder window through the display module to present the management reminder information; and/or drive the warning module to emit a reminder sound; and/or send the management reminder information to an associated mobile terminal through a wireless communication unit.

15. The system for household storage management according to claim 11, wherein the host further comprises a power supply module, the communication control module being configured for wireless communication with the sub-machine or the mobile terminals.

16. The system for household storage management according to claim 11, wherein the sub-machine further comprises a power supply assembly comprising a battery compartment and electrode contact pieces, and the battery compartment is configured to accommodate batteries.

* * * * *